Figure 1:
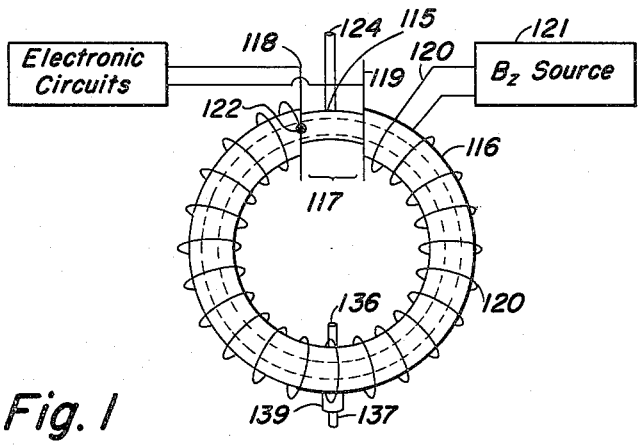

July 4, 1961

J. A. PHILLIPS ET AL 2,991,238

PINCHED PLASMA REACTOR

Filed June 19, 1958

11 Sheets-Sheet 1

WITNESSES:
Roy N. Smith, Jr.
Victor G. Laslo.

INVENTORS
Bergen R. Suydam, James L. Tuck
James A. Phillips
BY
Roland A. Anderson
A. Haney July 4, 1961 J. A. PHILLIPS ET AL 2,991,238
PINCHED PLASMA REACTOR Filed June 19, 1958 11 Sheets-Sheet 3

WITNESSES:
Roy H. Smith, Jr.
Victor G. Laslo.

INVENTOR.
James L. Tuck, James A. Phillips
Bergen R. Suydam
BY
Roland A. Anderson
ATTORNEY July 4, 1961

J. A. PHILLIPS ET AL 2,991,238

PINCHED PLASMA REACTOR

Filed June 19, 1958

11 Sheets-Sheet 11

INVENTORS
James L. Tuck, James A. Phillips
Bergen R. Suydam

United States Patent Office 2,991,238
Patented July 4, 1961

2,991,238
PINCHED PLASMA REACTOR
James A. Phillips, Bergen R. Suydam, and James L. Tuck, Los Alamos, N. Mex., assignors to the United States of America as represented by the United States Atomic Energy Commission
Filed June 19, 1958, Ser. No. 743,220
4 Claims. (Cl. 204—193.2)

The present invention relates to fusion reactors of the type wherein very high temperatures are obtained in a gaseous plasma by causing a compression of the plasma to form a pinched discharge. It is more particularly directed to methods and means for both reducing the quantity of impurities in the plasma and increasing the duration of the pinched discharge. Such a reactor is useful both as a bountiful source of neutrons and other radiations, and may ultimately prove to be operable as a net power-producing device.

Thus, the present invention is an improvement on the device disclosed in co-pending application S.N. 685,771, filed August 29, 1957, by Kruskal et al., and is also an improvement on linear pinched discharge creating devices described in the art, for example, the linear pinch apparatus disclosed by Burkhardt et al. in the Journal of Applied Physics, vol. 28, No. 5, 519–521, May 1957, entitled "Pinch Effect." The method and means of the present invention are described in relation to both such devices, and the modifications and changes required in the practice of the method and means of the present invention are pointed out hereinafter.

DEFINITIONS

As used throughout this specification, the expression "fusion reaction" has the usual meaning of a nuclear reaction in which a pair of light element nuclei such as deuterons or tritons combine to form a heavier element nucleus, without regard to the mechanism or conditions bringing about such reaction. The expression "fusion reactor" is intended to connote a device in which fusion reactions such as (D, D) and (D, T) take place between ionized particles of such gases in a plasma thereof by confining the gas or mixture of gases in a container at a low pressure and applying to the plasma magnetic and electric fields in such manner as to heat it to a high temperature and cause it to be separated from the walls of the container. The expression is to be distinguished from such fusion devices as accelerators, wherein a beam of charged particles are deliberately accelerated against a stationary target containing immobile reactant particles. The fusion reactors of the present invention are directed to structures operating by squeezing the plasma to increase its temperature and separate it from the material walls of its container and by increasing its temperature by such other means as current conduction, avoiding impurities in the plasma and maintaining the squeezed or pinched plasma in the pinched condition for a sufficient time to allow appreciable heating and fusion reactions to take place. It is not implied, however, that the dominant mechanism for such fusion reactions is actually thermonuclear as distinguished from accelerative, as such an implication can follow only from experimental evidence of tremendously high fusion reaction rates. This follows from the fact that there may be transitory localized fields in the plasma which are responsible for the rather low rate of fusion reactions actually observed.

On the other hand, the expression "thermonuclear reactions" as used herein signifies fusion reactions such as (D, D) and (D, T) taking place as a result of random collisions between the gas particles, the rate of fusion being enhanced because the gas temperature and hence the average particle velocity is quite high and not because such particles are accelerated to the necessary energies by externally produced electric fields. Nothing is implied about the energy balance in a device operating by virtue of such thermonuclear reactions, as it is understood that such a device is useful as a source of thermonuclear neutrons, avoiding the type of structure in which ionized particles are accelerated against stationary target particles.

The expressions "$B_z$" and "$B_z$-field" are used herein to designate the component of magnetic field intensity or magnetic flux density in the direction parallel to the longitudinal or major axis of the plasma confining chamber. Such fields are provided by the solenoid type coils disposed coaxially with such longitudinal axis. On the other hand, the expressions "$B_\theta$" and "$B_\theta$-field" are used to designate the azimuthal component of magnetic field intensity or magnetic flux density, transverse to the longitudinal axis of the gas confining chamber. Such fields are provided by the longitudinal component of current in the plasma itself.

THEORY

The theory of thermonuclear reactions, which for some time now has been well understood, teaches that such reactions can be maintained on a terrestrial scale only if a temperature of many millions of degrees Kelvin can be maintained, and even in this case, only if the fuel be restricted to elements of very low atomic number. See, e.g., G. Gamow and C. L. Critchfield, "Theory of Atomic Nucleus and Nuclear Energy Sources" (Oxford University Press: Oxford, 1949), chapter X. Now, of course, the element of lowest atomic number is hydrogen; thus in looking among the isotopes of hydrogen for those with the largest reaction cross section, attention is at once focussed on the deuterium-tritium (D, T) reaction $$_1H^3 + {}_1H^2 \rightarrow ({}_2He^4 + 3.5 \text{ mev.}) + ({}_0n^1 + 14.1 \text{ mev.})$$

The brackets are used to indicate that the helium nucleus carries 3.5 mev. and the neutron 14.1 mev. of the reaction energy. The large cross section and the large energy release make the (D, T) reaction appear very attractive, but the fact that tritium does not occur naturally makes it desirable to examine further possibilities. Therefore, also the (D, D) reaction, namely

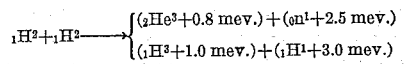

is to be considered, as the cross section is still quite high and deuterium is quite plentiful.

The temperature or energy dependence of the reaction rate, R, may be seen more clearly by considering first the equation $$R = N_D N_T \overline{(\sigma V)}$$

where $N_D$=number of deuterium nuclei per unit volume
$N_T$=number of tritium nuclei per unit volume, and
$\overline{\sigma V}$=product of nuclear velocity at the temperature involved and the cross section for the (D, T) reaction at that temperature, averaged over the prevailing distribution.

(Of course, $R = \frac{1}{2} N_D^2 \overline{(\sigma V)}$ where deuterium alone is used.) The cross section, $\sigma$, and hence the average product, $\overline{\sigma V}$, is a rapidly rising function of temperature, being negligible at ordinary room temperatures. At temperatures in the vicinity of 20 kev., $\overline{\sigma V}$ for the (D, D) reaction is rising as the cube of the absolute temperature. (Use here is made of the relationship $$T(\text{degrees Kelvin}) = 11 \times 10^6 E \text{ (Kev.)}.)$$

Values of $\sigma$ for the (D, D) and (D, T) reactions have been measured and reported by two of the present inventors and others in Phys. Rev. 93, 483 (1954). Values of $\overline{(\sigma V)}$ have been calculated and plotted as a function of particle energy by R. F. Post in Rev. Mod. Phys. 28, 338 (July 1956), at p. 341, for both the (D, D) and (D, T) reactions. Also derived by Post, op. cit., at p. 344, is the expression for bremsstrahlung loss in an ionized plasma together with the ideal ignition temperatures of 35 kev. for the (D, D) reaction and 4 kev. for the (D, T) reaction. Below these minimum kinetic temperatures (actually energies), the indicated reactions are not energetically self-sustaining (when the energy of the escaping fast neutrons is subtracted), as the radiation rate exceeds the rate at which charged particle energy is made available to the plasma.

It is clear from the foregoing paragraphs that a thermonuclear device must consist of a gaseous mass of hydrogen isotopes heated to a temperature of several millions of degrees. Under such conditions hydrogen is completely ionized, so that the gas is a plasma composed of bare nuclei and free electrons, and is therefore an excellent conductor both of electric currents and of heat. In order to control the reaction, the mass of reacting plasma must be confined, but this confinement clearly cannot be achieved by the use of a solid wall. For, if such a wall were used, it would have to be kept very cold compared to the plasma in order that it remain solid. But a cold wall surrounding a hot plasma means a large temperature gradient which, coupled with the high heat conductivity of the plasma, leads to a very rapid flow of heat out of the system. Very simple calculations show that no thermonuclear reaction could conceivably keep up with such an energy loss as heat conduction would furnish. Methods of calculating heat flow in gases are given in S. Chapman and T. G. Cowling, "The Mathematical Theory of Non-Uniform Gases" (Cambridge University Press: Cambridge, 1939) and elsewhere.

One method of overcoming the difficulty imposed by the thermal conductivity of the plasma is to utilize its electrical conductivity to confine the gas by means of a magnetic field. How this is accomplished is discussed, e.g., by Lyman Spitzer, Jr., in "Physics of Fully Ionized Gases" (Interscience Publishers: New York, 1956) or by T. G. Cowling in "Magnetohydrodynamics" (Interscience Publishers: New York, 1957). In the present device, use is made of a phenomenon known as the pinch effect, first described by Willard H. Bennett in Phys. Rev. 45, pp. 890–897 (1934). Thus the present invention may be practiced with a device in which a toroidal chamber provides an endless path for the gas particles. Low pressure gas is initially ionized and thereafter subjected to the action of electric and magnetic fields, created in the gas by means hereinafter described. The result is to produce a circulating electric current carried by the ionized gas particles, the electrons flowing around the torus in one direction and the positive ions in the other. It is a well known fact that parallel current elements exert an attractive force on one another; therefore, when the gas current exceeds a critical value (which may range from a hundred thousand to more than a million amperes), depending, in a manner well known to those skilled in the art, on the amount of gas and of magnetic field initially present, the current carrying gas will contract and pull away from the walls of the toroidal chamber. Thus the ionized gas is concentrated along the axis of the chamber. Between the gas and the chamber wall there is only a magnetic field, produced in part by the circulating electrical current in the gas, and it is this isolation of the gas from the chamber wall which reduces heat loss to the wall to tolerable limits. The large electrical current necessary for pinching the gas will also serve to heat the gas through which it flows, and temperatures of a million degrees centigrade or so can be achieved in this fashion.

The preceding paragraph outlines the method of reducing heat loss by thermal conduction. It is also necessary to investigate the other energy losses. In the first place, a part of the energy liberated in the nuclear reaction is carried away by high speed neutrons which inevitably escape from the plasma. This energy is therefore a complete loss as far as heating the gas is concerned, but may be recovered outside the apparatus by suitable absorbers. The principal remaining loss comes about as follows: When a high speed electron passes close to a positive ion, it will be deflected by the strong electrostatic field. The resulting acceleration of the electron can lead to electromagnetic radiation. This mechanism of energy loss by the electrons is known as bremsstrahlung and is a well known phenomenon. See, e.g., W. Heitler, "The Quantum Theory of Radiation," second edition (Oxford University Press: Oxford, 1954), chapter V. section 17; also R.F. Post, ibid. As the plasma is quite transparent to the bremsstrahlung spectrum of radiation, this phenomenon leads to a loss of energy from the gas (again, external absorbers make it possible to recover this energy as heat outside of the gas). The way to minimize bremsstrahlung losses is clear when it is noted that the bremsstrahlung cross section is proportional to the square of the atomic number of the scattering ion. If the gas contains only isotopes of hydrogen, then the bremsstrahlung losses are quite tolerable. However, the presence of any appreciable amount of materials of high atomic number, e.g., iron, silicon, or aluminum from the vessel walls, will poison the fuel in the sense that bremsstrahlung losses will exceed the energy supplied by the fusion reactions. It is also clear that bremsstrahlung losses become less important as higher plasma temperatures are obtained, as the dependences are exponential for the fusion cross sections but only $T^{1/2}$ for bremsstrahlung.

The prevention of contamination of the fuel by materials of high atomic number is a wall problem. Such materials may enter the system if the wall is heated too much, either locally or generally over its interior surface. One of the purposes of the present invention is to absorb the bremsstrahlung and thus protect the wall of the vessel from this source of heat. Another purpose of the invention is to provide a good conductor of heat so that energy therein deposited will be drained away before the temperature rise becomes dangerous. Thus, by keeping the surface temperature low, contamination from the walls is kept under control, as a wall maintained at a low temperature will not boil off particles.

It has been seen how heat losses to the wall may be minimized (a) by keeping the reacting plasma clean, i.e. relatively free of wall materials, and (b) by confining the plasma in such a way that it does not make contact with the walls. How the present invention accomplishes the first of these objectives has been described. How the invention helps in the accomplishment of objective (b) is the next subject for discussion.

As was described above, it has now been known for a long time how a circulating electrical current in the gas will produce a magnetic field which can be used to confine the gas to a region near the axis of the toroidal chamber. However, it was quite early discovered that, unless something special were done, the equilibrium thus attained would be unstable, that is to say, any small irregularity in the pinched plasma would grow until the plasma would strike the wall. See M. D. Kruskal and J. L. Tuck, "Instability of a Pinched Fluid in a Longitudinal Magnetic Field," Los Alamos Report LA–1716 (unclassified). It has since been shown, however, how a pinched plasma might be stabilized by (1) surrounding the plasma with a good conductor of electricity and (2) by arranging that there be a longitudinal magnetic field the magnitude of which is greater in the plasma than in the empty space between the plasma and the wall. See Marshall Rosenbluth, "Stability of the Pinch," Los Alamos Report LA–2030, TID–1157 (declassified September 15, 1957). The various embodiments of the present invention include the good electrical conductor mentioned above. The purpose of this conductor is, briefly, to provide a stabilizing influence by inhibiting the motion of magnetic lines. Arranging that the longitudinal component of the magnetic field be largest inside the plasma is accomplished by applying this field (called the $B_z$-field for short) before the gas is pinched. In this way, pinching the gas also pinches the $B_z$-field so that, in the pinched state, the $B_z$-field is strong in the plasma and weak in the vacuum between the plasma and the wall.

It is now well known that a trapped longitudinal magnetic field has a stabilizing influence on a linear pinch. Once such a stabilized pinch is set up, however, diffusion will lead to mixing of the initially crossed fields, the torsion of the field lines will diminish, and the plasma may ultimately become unstable. To prevent such instability from occurring, or at least to stabilize the pinched plasma for a longer time, was the objective of one study leading to the present invention.

The result of this study may be briefly summarized as follows: The $B_z$-field trapped in the plasma as outlined above produces, in conjunction with the cross sectional or $B_\theta$-field produced by the circulating current, torsion of the magnetic field, that is, the field lines in adjacent layers are not parallel. This torsion, or shearing, of the field lines tends to produce stability and the greater the torsion, the greater this tendency towards stability. Instability, on the other hand, is produced by a radial pressure gradient in the plasma, and the question of stability is decided by which of these two influences dominates. Now when the plasma and the $B_z$-field are pinched, some $B_z$-field will be left over, namely that which was initially outside the plasma, and the full twist of the B-lines will be something less than ninety degrees. This invention provides a device, through which current can be passed, which can be arranged to cancel, or even to reverse, the $B_z$-field in the region outside the plasma after it has been pinched. When this is done the full twist of the field lines will be equal to, or even considerably more than, a full right angle. Thus the present invention provides additional control over the stability of the plasma by furnishing a means of increasing at will the torsion of the magnetic lines.

The importance of this ability to produce additional torsion in the B-lines by reversing the $B_z$-field outside the gas is quite great. For even if a pinch were so formed that it would be stable without this precaution, diffusion would lead to a redistribution of plasma and field until an unstable configuration were reached. In this case, reversing the $B_z$-field, and thus producing excess torsion, would allow the field lines to unwind—or alternatively stated, would allow the $B_z$- and the $B_\theta$-fields to mix for a longer time before instability is reached. Thus reversing the $B_z$-field gives two benefits: (1) A longer time before instability is reached; (2) greater heating of the gas. This latter comes about because the unwinding of the B-lines, caused by diffusion, induces an electric field along the B-lines which in turn causes a current to flow, also along the B-lines. This current, flowing in the direction of an electric field, produces heating; clearly, the greater the initial torsion the greater this heating.

It is therefore an object of the present invention to provide a method and apparatus for eliminating wall particle contamination of a pinched plasma in a fusion reactor, and in particle and radiation sources utilizing a pinched plasma.

Another object of the present invention is to provide a method and apparatus for reducing bremsstrahlung heating of the gas-confining wall, to insulate the pinched plasma from contact with a contaminating wall, and to remove heat from the discharge volume, without introducing electrical insulating problems in the confining vessel.

A further object of the present invention is to provide such a method and apparatus which, in addition to preventing plasma contamination, increases the stability of the pinched dicharge.

A further object is to provide conducting walls around the reaction vessel, and an internal, conducting, wall-protecting winding, wherein the internal winding creates a field component in a direction opposite to that of the axial magnetic field within the plasma, thereby producing a large shear in the magnetic field which materially increases the time during which the pinched plasma is stable.

A still further object of the present invention is to provide such a method and apparatus for controlling and stabilizing an energized, ionized, pinched, current carrying gas, wherein said gas consists of a thermonuclear fuel.

A still further object of the present invention is to provide such a method and apparatus utilizing an ionized, energized, pinched, current carrying thermonuclear fuel in the form of a gas, said pinched current carrying gas or plasma being stabilized for long periods of time by the creation of a $B_z$-field or longitudinal magnetic field outside of the plasma having a direction opposed to that within the plasma, wherein the energy liberated by said method and in said apparatus includes energy in the form of bremsstrahlung, and neutrons, protons, tritons, $He^3$, and alpha particles.

A still further object is to provide a method and means for obtaining large quantities of useful radiations such as neutrons, bremsstrahlung and charged particles, or any of them.

Figure 2:
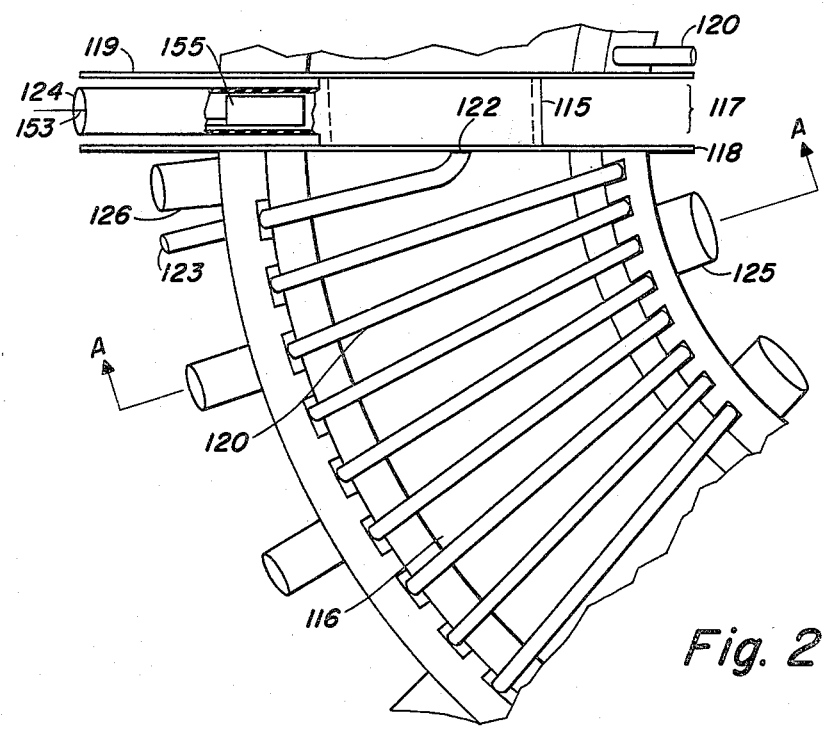
Figure 3:
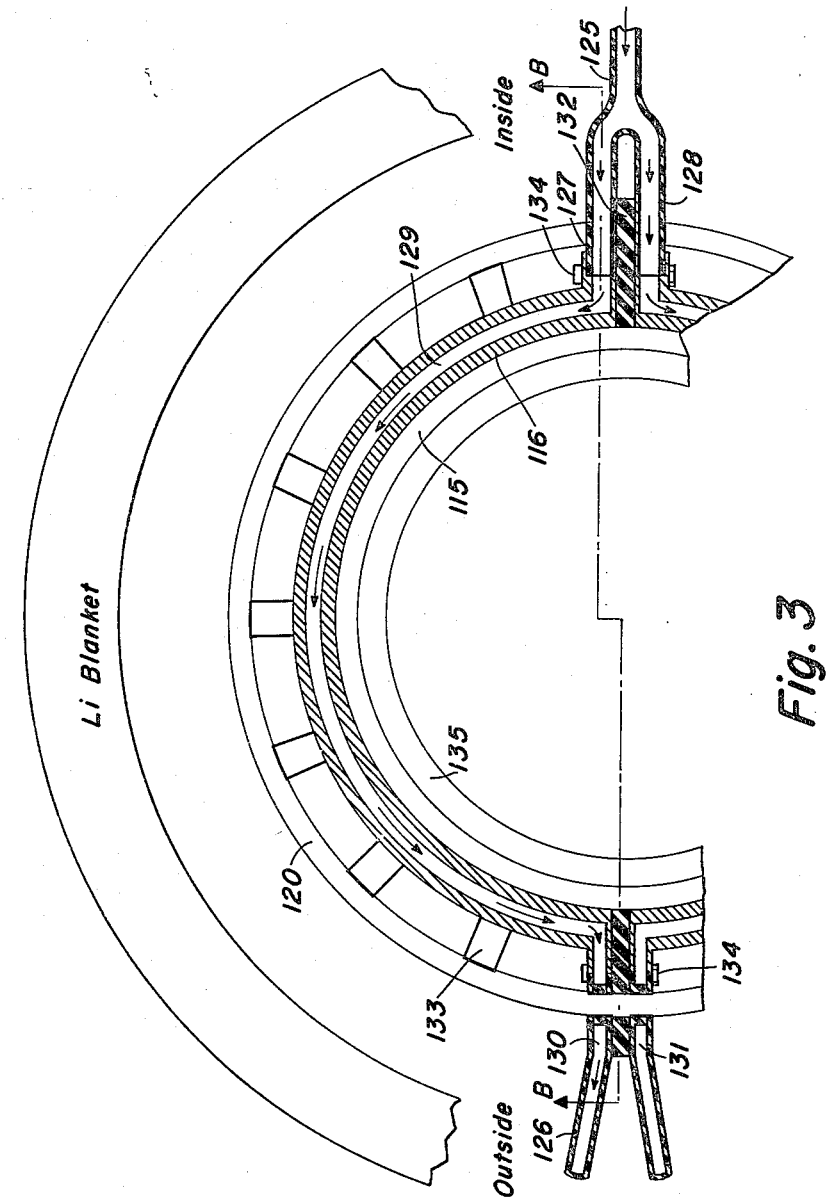
Figure 4:
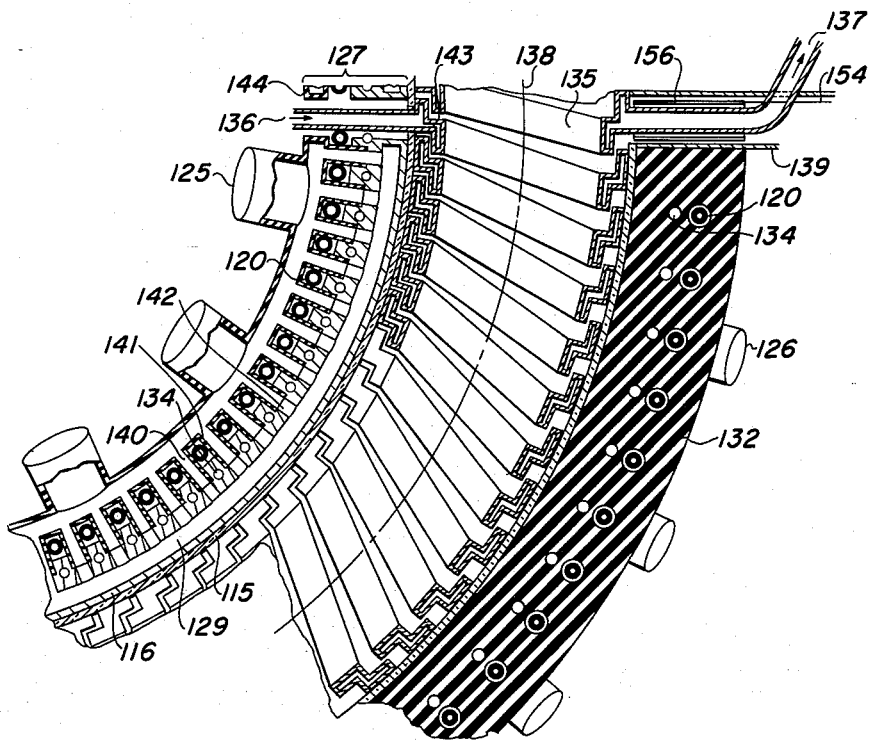
Figure 5:
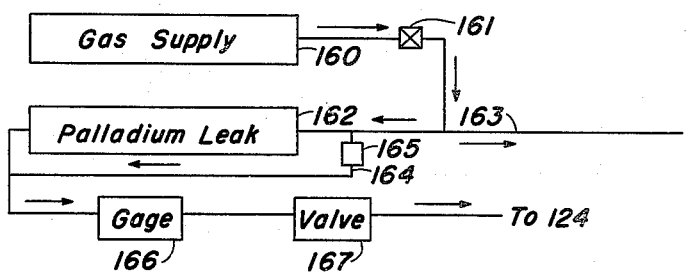
Figure 6:
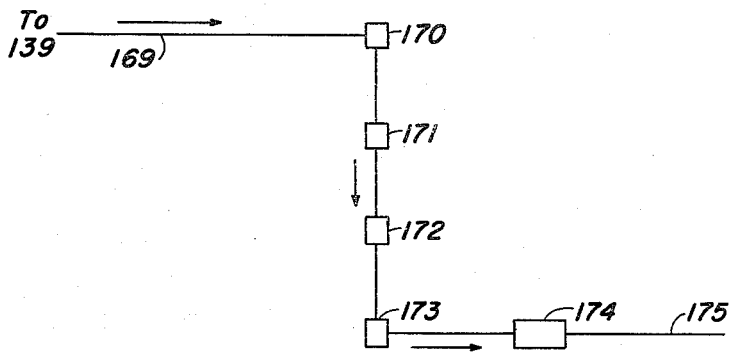
Figure 7:
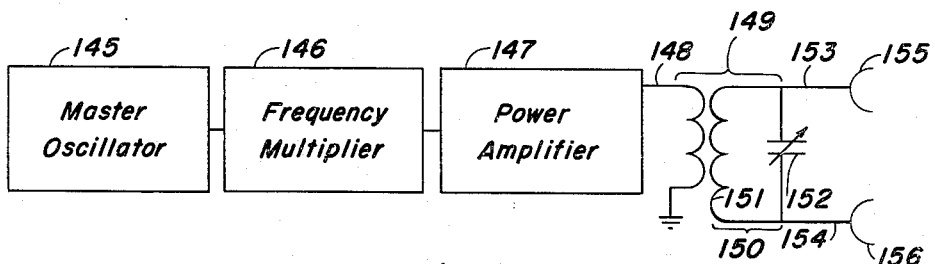
Figure 8:
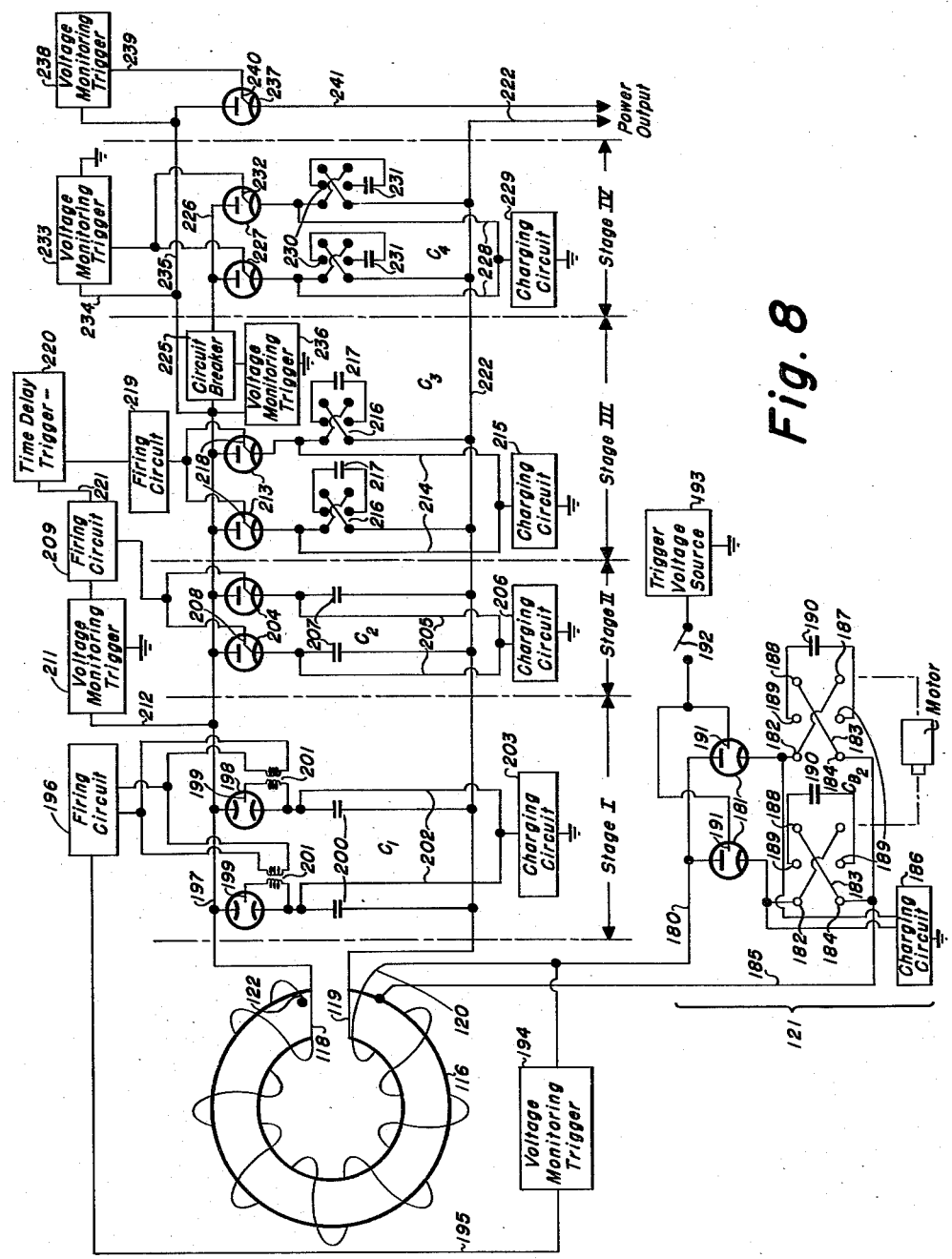
Figure 9:
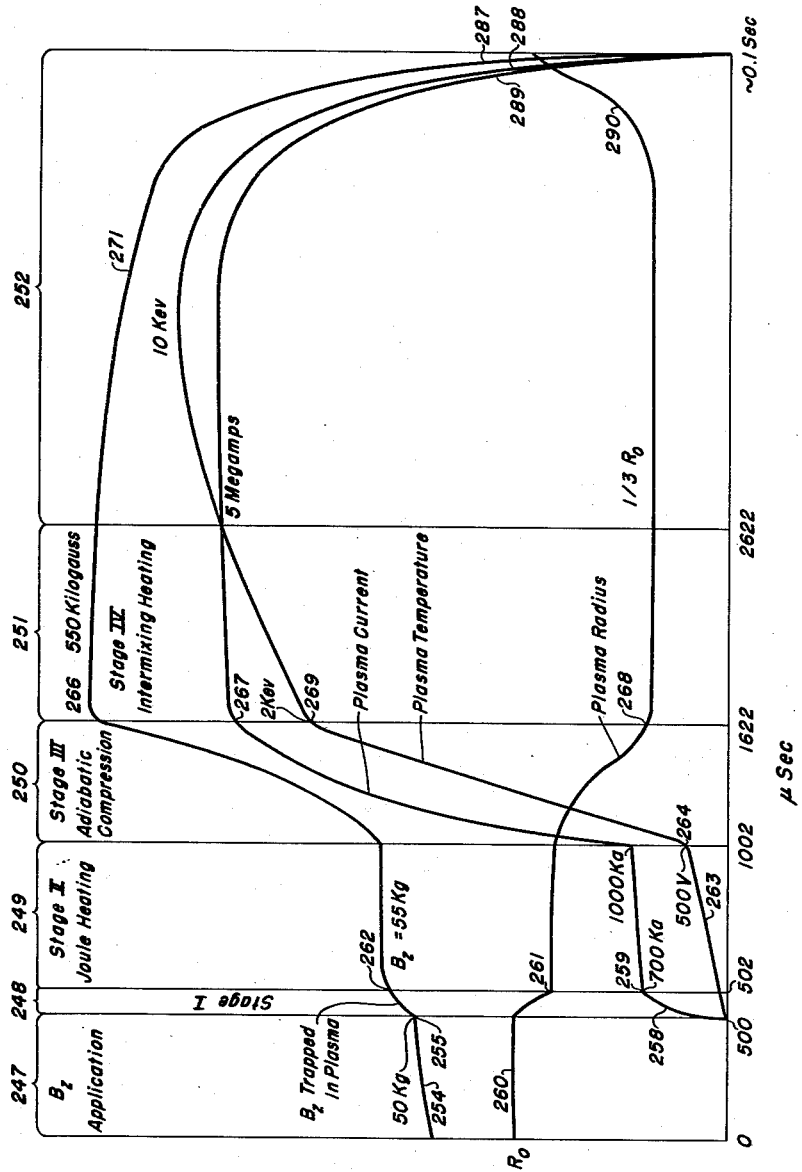
Figure 10:
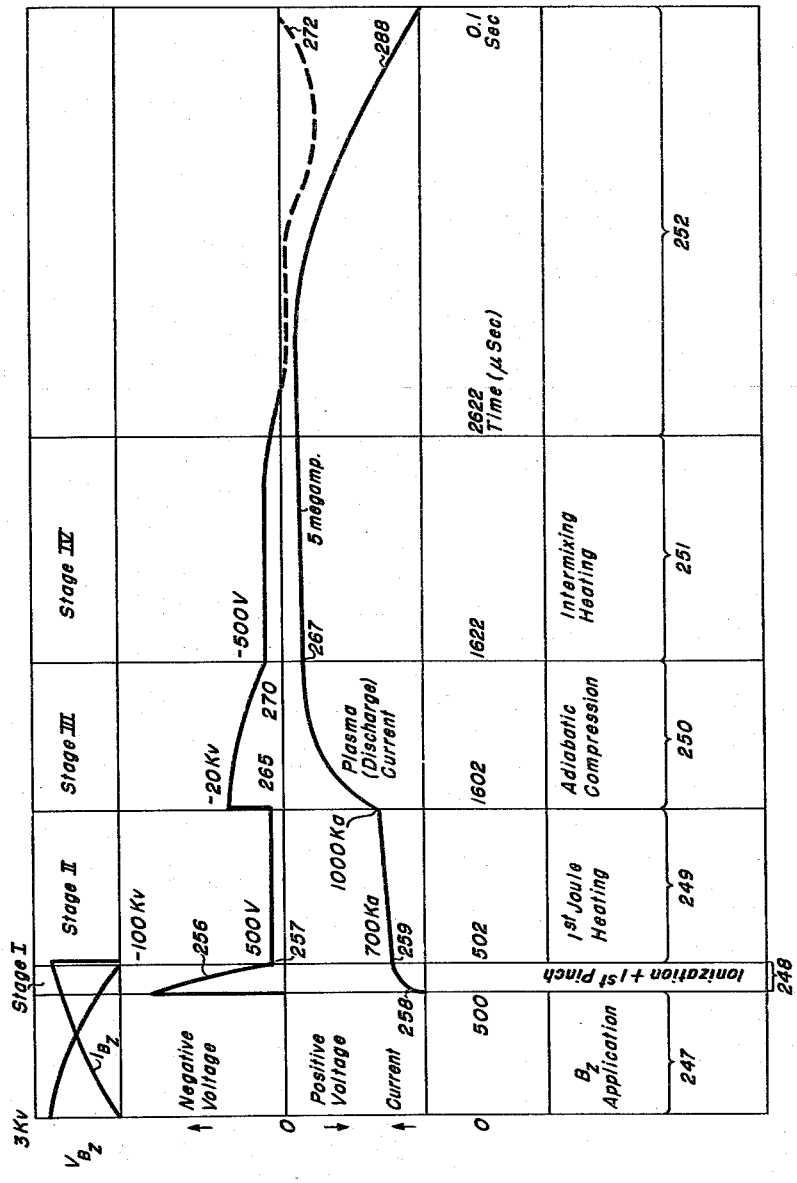
Figure 11:
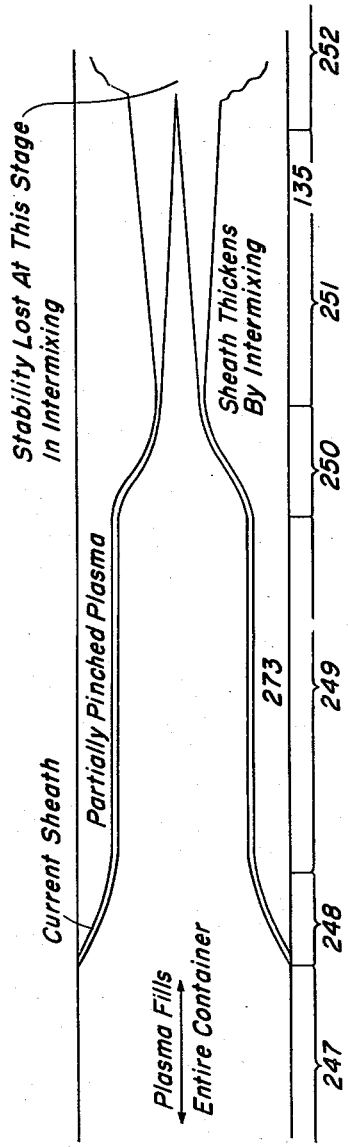
Figure 12:
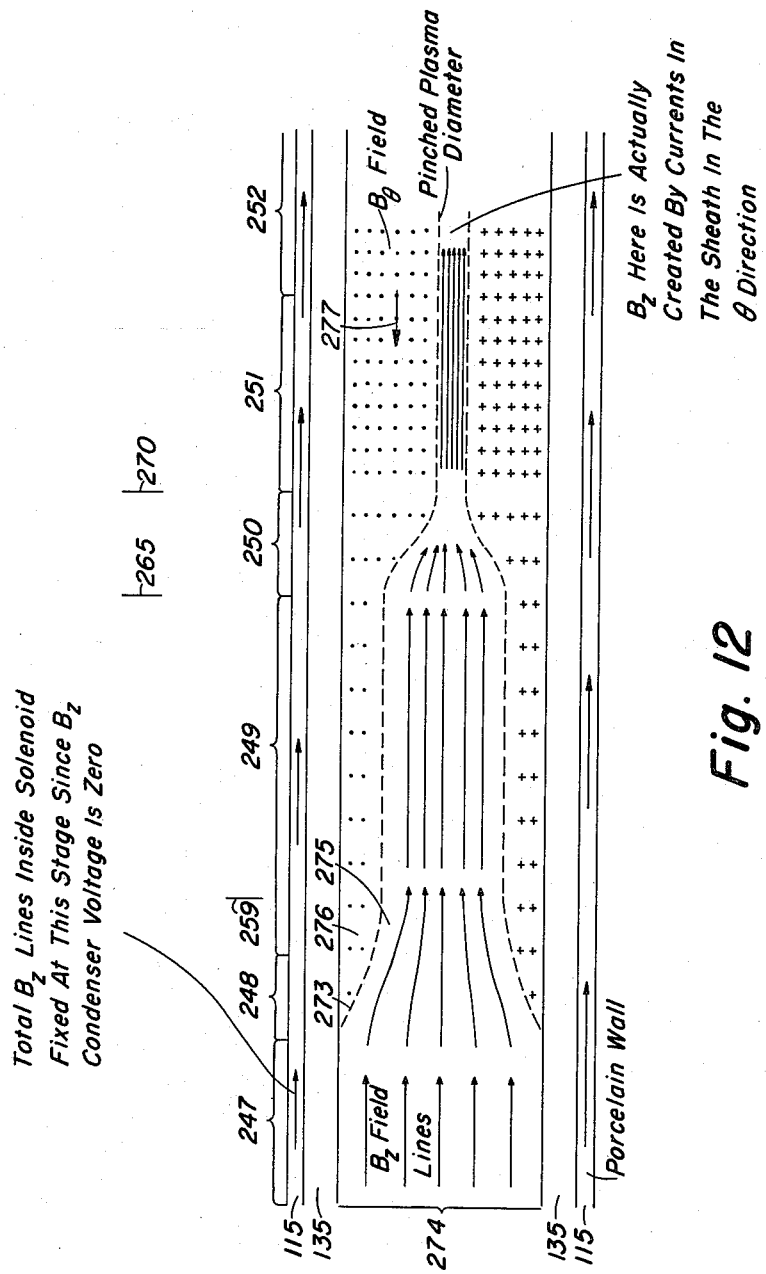
Figure 13:
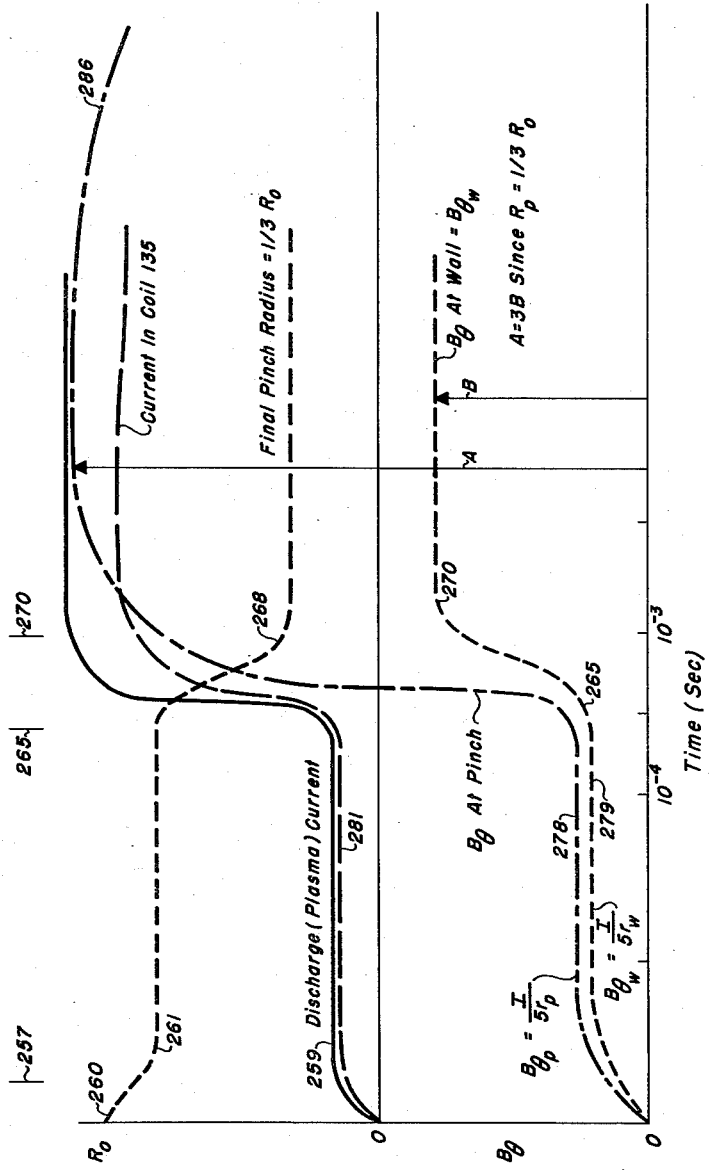
Figure 14:
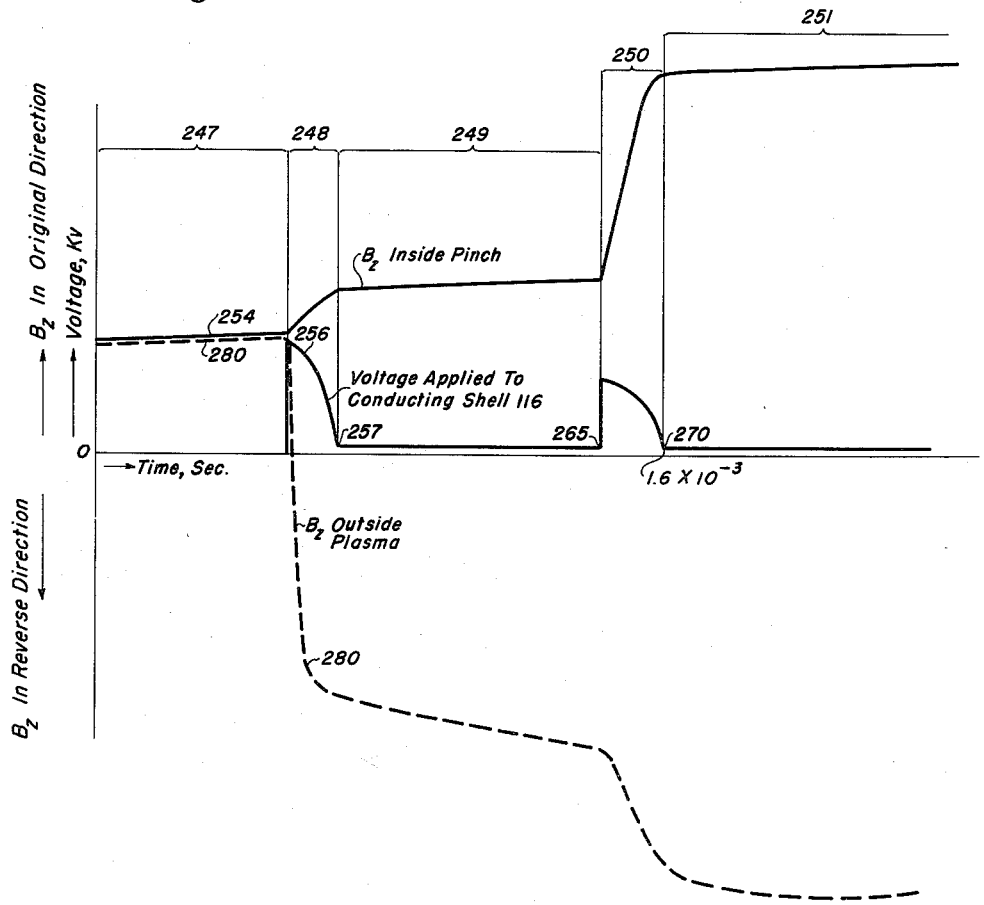

The above and other objects are accomplished in the present invention by incorporating in the aforementioned prior art devices a hollow conductor on the inside of the gas confining chamber. This conductor, which will be more fully described hereinafter, is wound in such a direction that it will produce an axial magnetic field in the space outside the plasma in a direction opposed to that of the $B_z$-field trapped inside the plasma, thereby providing the stabilizing effect mentioned. The hollow space within the conductor serves as a passage for a coolant to carry away the energy deposited in conductor and coolant by radiations from the plasma. This conductor or coil is so shaped and wound that no part of the pinched plasma has a direct line of sight to any part of the confining wall. The details of said coil will be outlined in the description of the several figures attached to and hereby incorporated in this specification, in which:

FIGURE 1 is a schematic diagram of a preferred embodiment of the present invention, having a toroidal geometry, FIGURE 2 is a top view of a portion of the toroid showing the external components, FIGURE 3 is a section along line A—A of FIGURE 2, FIGURE 4 is a sectional view taken along the line B—B of FIGURE 3, FIGURE 5 is a schematic drawing of the gas supply, FIGURE 6 is a schematic drawing of the vacuum system, FIGURE 7 is a partially schematic drawing of the initial gas ionizing system, FIGURE 8 is a circuit diagram of the primary coil circuit and associated electrical energy supply system, FIGURE 9 is a graph showing the time relationship between the various voltages, currents and temperatures with respect to the pinched discharge, FIGURE 10 is a graph of the voltage and current during one cycle of operation, FIGURE 11 is a graph showing the pinched discharge as a function of time, FIGURE 12 is a schematic illustration showing the geometry of the plasma and the location of the various fields as a function of time, FIGURE 13 is a graph of the $B_\theta$-field, i.e., the self-constricting magnetic field as a function of time, and FIGURE 14 is a graph of the relative effect of coil 135 on the $B_z$-field outside of the pinched plasma.

APPARATUS

Note that in the following description of a preferred embodiment of the present invention and the method of operating it, reference numerals below 115 have not been used. FIGURE 1 is a schematic drawing of such an embodiment, wherein the details of the cooling apparatus are omitted in order to more clearly show the fundamental apparatus of the invention. The reactor comprises a toroidal chamber 115 constructed from porcelain, quartz, or other insulating material. This chamber may be prefabricated by itself or it may be formed by spraying a glass coating on the conducting shell 116, appropriate means being used to bridge the slot or discontinuity 117 in shell 116 mentioned below. Materials of low atomic number, e.g., lithium borides, are preferred to avoid contamination of the plasma by high Z number materials. The toroidal chamber functions as the original container for the gas and defines the volume within which a thermonuclear fuel is ionized, pinched and stabilized for relatively long periods. The toroidal chamber 115 is enclosed within a conducting shell 116 which is made from copper or other electrically conducting material. The conducting shell 116 is the electrical primary for creating the pinched plasma and for inducing circulating currents in the winding 135 as described in detail hereinafter. The conducting shell 116 has a slot or discontinuity 117 which is defined by two plates 118 and 119 spaced apart with insulating material (not shown) between plates 118 and 119.

Around the shell 116 is a $B_z$-winding 120 which supplies the longitudinal magnetic field within the plasma. One end of the $B_z$-winding 120 is connected to a source of voltage 121, the other end 122 being connected to the plate 118. The $B_z$ source is also connected to the conducting shell 116 on the side opposite the connection 122 so that the shell 116 is the return conductor for the $B_z$ source 121. The $B_z$-winding 120 is a tube through which distilled water or other coolant is passed.

FIGURE 2 shows a more detailed view of the outside of the thermonuclear reactor of the present invention. The $B_z$-winding 120 has its end 122 connected to a heat exchanger (not shown) through lead 123, with a similar connection (not shown) at its other end. The heat exchanger and lead 123 are electrically insulated from the winding 120 and the source 121. A gas inlet pipe 124 is provided to the toroidal chamber 115 and it is through inlet pipe 124 that the thermonuclear fuel, preferably a tritium-deuterium mixture of equal proportion, flows into the toroidal chamber 115. A plurality of non-conducting coolant inlet pipes 125 are connected to the conducting shell 116 for cooling the conducting shell and removing much of the heat created by the fusion reactions taking place within the toroidal chamber 115.

As is apparent from FIG. 3, coolant inlet pipes 125 are connected through the conducting shell 116 to the coolant outlet pipes 126 and 131. FIGURE 3 is a cross-sectional view of the minor toroidal diameter taken along section A—A of FIG. 2. From this figure it is apparent that the coolant inlet pipes 125 are connected to two inlet manifolds 127 and 128, the coolant inlet manifolds being associated with the top and bottom halves of the split conducting shell 116. The conducting shell 116 is made in two parts insulated from each other in order to provide a non-conducting path for the $B_z$-field, although it can be made in a single section if the thickness is sufficiently low to allow reasonably prompt damping of eddy currents. The manifold 127 is connected through channel 129 in the conducting shell 116 to outlet manifold 130, from which electrically insulated outlet pipes 126 remove the heated water and/or steam to a common steam header for use in producing power. Manifold 128 is connected in a similar manner to outlet manifold 131, the bottom portion of FIG. 3 being symmetrically identical with the top portion shown.

The electrical insulator 132 separating the upper and lower portions of the conducting shell 116 need only be approximately 1/8-inch thick, since it must withstand the voltage of only one turn of the $B_z$-winding, both portions of the conducting shell 116 being connected in parallel to the same electrical source and therefore applying no electric potential to the insulator 132. The $B_z$-winding 120 is spaced from the conducting shell 116 by means of spacers 133 in order to provide room for the bolts 134 which hold the semicircular segments of the conducting shell 116 around the toroidal chamber 115.

Referring now to FIG. 4, which is a sectional view along line B—B of FIG. 3, the detailed arrangement of the components in the toroidal chamber is immediately apparent. The coolant (distilled water) is pumped through inlets 125 into the manifold 127, where it divides and enters a plurality of passages 140 defined by the re-entrant walls 141 of manifold 127. These walls 141 are of insulating material as is manifold 127 and inlets 125. The passages 140 are connected to outlet openings 142 in the conducting shell 116. Openings 142 are connected to the channel 129 in the conducting shell 116. Thus water pumped into inlets 125 passes into the channel 129 and to the outlet manifold which is constructed in the same manner as the inlet manifold 127 described, and is not shown in detail.

Adjacent and within the conducting shell 116 is the toroidal chamber 115 which contains a conducting, hollow, wall-protecting coil 135 arranged inside of the toroidal chamber 115. This coil has a water inlet 136 passing through an opening 144 in the inlet manifold assembly, which connects to the channel 143 within the coil 135 through which the coolant flows. The coil 135 is constructed so that each turn is spaced from each other turn and no portion of the wall of the chamber 115 is exposed with respect to the center line 138 of the toroidal chamber 115. Further, the water inlet and outlet for coil 135 are placed so that the water or other coolant passing through the channel 143 of coil 135 travels completely around the inside of the toroidal chamber 115 to a point adjacent but spaced from the inlet point and is there connected to the outlet 137. The outlet 137 passes through gas outlet 139 of the toroidal chamber 115, the gas outlet 139 being located diametrically opposite the gas inlet 124 (see FIG. 2). The conducting, hollow, wall-protecting coil 135 is preferably constructed of a metal or alloy having both a low Z-number and a high figure of merit (explained below). It has distilled water running through it to carry away the heat deposited by the bremsstrahlung as described in more detail hereinafter. This coil 135 functions to cancel or reverse the $B_z$-field between the pinched plasma and the toroidal chamber 115 to provide torsional magnetic fields at the boundary of the plasma, as explained in detail hereinafter with respect to FIG. 14, and to eliminate contamination of the discharge by wall particles given off because of bremsstrahlung heating.

GAS SUPPLY SYSTEM

As stated hereinbefore, the present invention utilizes low density ionized gas to produce a thermonuclear reaction. This gas, preferably either deuterium, tritium or a mixture thereof, is supplied to the toroidal chamber 115 through gas inlet 124. The apparatus of FIG. 5 is connected to inlet pipe 124. The supply means consists of a gas supply tank 160 from which the pure thermonuclear fuel is passed through a pressure regulating valve 161. The regulated gas is then passed through a palladium leak 162. A conduit 163 is provided so that the palladium leak 162 may be evacuated before actual operation begins. A by-pass line 164 is provided through a normally closed valve 165 so that the entire vacuum system, as well as the toroidal chamber 115, can be flushed with gas directly from the gas supply system. The by-pass line 164, as well as the output of the palladium leak 162, are fed through gauge 166, and valve 167 to a terminal pipe which is connected to the inlet pipe 124. The gauge 166 indicates the various gauges that may be used in maintaining the proper amount of gas to be allowed to enter the reaction chamber.

VACUUM SYSTEM

Connected to the gas outlet 139 is the vacuum system shown in FIG. 6. Since there must be a constant flow of gas through the toroidal chamber 115, to provide new fuel to sustain the fusion reactions taking place and to remove the reaction products, i.e., hydrogen, helium and to a limited extent tritium and $He^3$, the outlet 139 from the reaction chamber is connected by pipe 169 to a flow control valve 170. This valve controls the aperture through which the drawn-off gas passes and thereby controls the rate of such flow. Attached to the control flow aperture of this valve is the vacuum system. This system consists of a large aperture stopcock 171, a liquid air trap 172, a two-stage mercury diffusion pump 173, and a standard motor driven vacuum pump 174 vented through outlet 175 to any convenient gas tight chamber. The reaction products confined in this chamber may then be separated in any manner known in the art. All the latter named elements are well-known in the art.

INITIAL IONIZATION SYSTEM

As pointed out hereinbefore, the operating characteristics of the present device require that the gas present in the toroidal reaction chamber be ionized before the actual operating cycle is begun. For this purpose a pre-operation gas ionizing R.F. system is provided. This R.F. system (see FIG. 7) consists of the following components. The master oscillator 145 feeds its output of from 5–10 megacycles into a frequency multiplier circuit 146. The output of the multiplier circuit, which has frequencies of from 5 to 110 megacycles, is amplified by power amplifier 147, which has a power output of many kilowatts. This amplifier output is fed through a coaxial cable 148 to a tuning circuit indicated generally at 149.

The above-indicated circuits, i.e., the master oscillator, frequency multiplier and power amplifier circuits, are diagrammatically indicated in FIG. 7, since their respective components and interconnections are well known in the art.

The tuning circuit 149 consists of a tank circuit 150 having an impedance coil 151 in parallel with a variable capacitance 152. The tank circuit 150 is impedance coupled to the output of power amplifier 147. Thus, by means of variable capacitance 152, the tank circuit can be tuned to the R.F. output and will have the same frequency as the driving circuit.

The two leads 153 and 154 carry the output of the tuning circuit 149 and are connected to semi-cylindrical capacitance electrodes 155 and 156, respectively. The electrode 155 is sealed within the tubular gas inlet pipe 124 (see FIG. 2). The second electrode 156 is sealed within the gas outlet pipe 139 which is located diametrically opposite to the first member (see FIG. 4). Electrode 156 constitutes the second plate of a capacitor, while electrode 155 constitutes the first plate. Thus, the capacitance between these two electrodes will ionize the gas present between them, i.e., the gas contained within the toroidal reaction chamber 115.

PRIMARY CIRCUITS

The various electronic circuits associated with the fusion reactor of the present invention are shown schematically in FIG. 8. Specifically the $B_z$ coil 120 is connected through lead 180 to the plates of ignitrons 181, two ignitrons in parallel being shown to indicate that a plurality of these tubes are required for the particular circuit. The cathode of each of these ignitrons is connected to a pole 182 of a double pole double throw motor operated switch indicated generally at 183. The associated pole 184 of each of these switches is connected through lead 185 to the conducting shell 116. The poles 182 are also connected to a charging circuit 186 and to the opposite associated pole 187 of the switch 183. The poles 184 are connected to the associated opposite poles 188. The central poles 189 are connected to condensers 190. These condensers indicate a condenser bank having a capacitance of 1400 microfarads with a rating of 10 kv. At the operating condition of 5 kv. the total stored energy is $1.75 \times 10^4$ joules. The starter electrodes 191 are connected through switch 192 to a trigger voltage source 193. Lead 180 is connected through a voltage monitoring trigger circuit 194 by lead 195 to a firing circuit 196. Plate 118 of conducting shell 116 is connected to common lead 197 and plate 119 of conducting shell 116 is connected to common lead 222.

Stage I of the primary voltage circuit consists of spark gaps 198 having a triggering probe 199. The gaps 198 insulate the condensers 200, one side of the condensers 200 being connected to common lead 222 and the other side of condensers 200 to one electrode of the spark gap 198. The other electrode of the spark gap is connected to common lead 197. The condensers 200 indicate a condenser bank having a total capacitance of $20\mu f$. at 100 kv. with a total stored energy of $10^5$ joules. The trigger probe 199 is connected inductively at 201 to the firing circuit 196. The condensers 200 are connected through leads 202 to a common charging circuit 203.

Stage II consists of ignitrons 204 having their plates connected to common lead 197 and their cathodes connected by leads 205 to a charging circuit 206. The cathodes are also connected to one side of condensers 207, the other sides of 207 being connected to common lead 222. The starter electrodes 208 of the ignitrons 204 are connected to a firing circuit 209 which is connected through lead 210 to a voltage monitoring trigger 211 which monitors the voltage on common lead 197 through lead 212.

Stage III of the primary voltage circuit consists of ignitrons 213 having their plates connected to common lead 197 and their cathodes connected through leads 214 to a common charging circuit 215. The cathodes are also connected to double pole double throw motor operated switches 216 which are connected in the same manner as switches 183 above described. The condensers 217 represent a condenser bank of $28{,}000\mu f.$ capacitance at 20 kv. with a total stored energy of $5.6 \times 10^6$ joules. The starter electrodes 218 are connected to a common firing circuit 219 which is connected to a time delayed trigger 220 which is connected through lead 221 to the firing circuit 209. The common lead 197 is connected through a circuit breaker 225 to lead 226 which is connected to the plates of ignitrons 227. The cathodes of ignitrons 227 are connected through leads 228 to a charging circuit 229. The cathodes of ignitrons 227 are also connected to double pole double throw motor driven switches 230 which are similar to the above described switches 183. The condensers 231 connected across the central poles 230 represent a bank of condensers having a total capacitance of 10 f. at 500 volts with a total stored energy of $1.25 \times 10^6$ joules. The starter electrodes 232 of ignitrons 227 are connected to a voltage monitoring trigger 233 which is connected by lead 234 to secondary lead 235 which is connected to common lead 197. The voltage monitoring trigger 233 monitors the voltage on lead 235. The circuit breaker 225 is set to break the circuit at 500 volts by means of voltage monitoring trigger 236 which is connected to common lead 197 and to the circuit breaker 225.

The secondary lead 235 is connected to the plate of ignitron 237 and to a voltage monitoring trigger 238 which is connected through lead 239 to the starter electrode 240 of the ignitron 237. The cathode of ignitron 237 is connected through lead 241 to one side of a load (not shown), the other side of the load being connected to common lead 222.

OPERATION

In preparing to operate the present device, a very high vacuum is first attained within the toroidal reaction chamber 115. The gas supply 160 is turned off by means of valve 161 and the palladium leak 162 (see FIG. 5) is evacuated through conduit 163 to remove all contaminants in toroidal chamber 115.

The next operation is to close the conduit 163, open the gas supply valve 161 and open valve 165 to permit the gas to by-pass the palladium leak 162 so that the gas supply system and the reaction chamber will be flushed with the gas to be used as the thermonuclear fuel. The flushing of the system is continued initially for a relatively long period of time to insure that all of the high Z reactants have been removed from the toroidal reaction chamber 115.

The by-pass valve 165 is then closed and the gas flow thereafter is regulated by the palladium leak 162 and valve 167 in such a manner that the stabilized pressure within the toroidal chamber 115 has a value of from 1 to 100 microns, preferably the order of 10 microns, prior to actual electrical operation. The palladium leak 162 will regulate the flow of gas into the supply system up to valve 167. The vacuum system (see FIG. 6) is capable of removing the gas at a much faster rate than the supply system is capable of supplying it. A variable aperture, electrically operated valve 170 of any type well-known in the art of vacuum systems is provided so that the gas within the reaction chamber prior to electrical operation is maintained at a constant density of about $10^{15}$ particles per cc. (the order of 10 microns). Thus continual thermonuclear fuel flow through the chamber 115 during operation is employed.

The initial ionizing system is then energized, i.e., an R.F. field is created between the two electrodes 155 and 156 (FIG. 7). Since these electrodes are located between the two diametrically opposed gas inlet and outlet members 124 and 139 respectively (FIG. 1), this field will be divided into two paths, each path circumscribing one half circle. The gas within the reaction chamber 115 will be subject to this field and will be initially slightly ionized. This step is referred to hereinafter as the pre-ionizing stage.

In preparing the electrical circuit shown in FIG. 8 for operation, the condensers 190 of the $B_z$ source 121 are charged through charging circuit 186 by connecting poles 182 and 184 to poles 189. In this manner the condensers 190 will have a particular predetermined polarity.

Charging circuits 203, 206, 215 and 229 are energized and condensers 200, 207, 217 and 231 respectively, are charged to their rated capacity. It should be noted that condensers 217 and 231 will be charged with a particular polarity dependent upon switches 216 and 230 respectively. In general it may be stated that upon discharge of any one of the four stages of condensers the voltage on common lead 197 would be negative with respect to ground in the preferred embodiment. Stages I through IV are now ready for operation.

The various coolants supplied are now activated in the following manner. Distilled water used as a coolant in the preferred embodiment is passed through non-conducting coolant pipes 125, through coolant inlet manifold 127, around channel 129 through coolant outlet manifold 130 into non-conducting coolant outlet pipes 126. The $B_z$-winding 120 has distilled water passing through it through lead 123 to a heat exchanger located external to the apparatus of the reactor. Coil 135 is provided with a coolant through inlet 136. The coolant passing through this coil passes entirely around the torus to a point adjacent to inlet 136 where it flows out through outlet 137. This water then passes through a heat exchanger (not shown) and back into inlet 136. Coil 135 has its inlet 136 and outlet 137 electrically connected so as to constitute a shorted secondary for the conducting shell or primary 116.

Other coolant jackets may be provided with liquid metal coolants to substantially surround the entire reactor and carry away a large percentage of the energy being dissipated in the form of radiations and neutrons. A liquid metal coolant may be preferable for the primary 116, both on account of the higher working temperature, and the more efficient heat transfer. It should be noted that no description has been made of the shielding facilities, port facilities or other personnel protecting apparatus which would normally surround a nuclear reactor. Such facilities could be of the type ordinarily required for a nuclear chain-reacting system, including special facilities for utilizing the copious supply of neutrons provided by the reactor of this invention. Furthermore, the neutrons produced in the reactor of this invention could be used for breeding purposes, as has been disclosed in the co-pending application of James L. Tuck, S.N. 490,705, for the operation of a sub-critical fission reactor assembly, or for the manufacture of tritium.

The reactor is now ready for initial operation. Switch 192 is closed to connect trigger voltage source 193 to the starter electrodes 191, thereby making ignitrons 181 conducting and discharging condensers 190 through lead 180 and winding 120 to connection 122, back through conducting shell 116 and lead 185. When the voltage on lead 180 drops to zero, that is, when the $I_{B_z}$ current is a maximum, the voltage monitoring trigger 194 will trigger firing circuit 196. The firing circuit 196 will pulse triggering electrodes 199 of spark gaps 198 through the inductive coupling 201 so that condensers 200 will discharge through spark gaps 198 and apply the stage I potential to the conducting shell 116 through leads 197 and 222, and plates 118 and 119, respectively. When the voltage on common lead 197 drops to about 500 volts, the voltage monitoring trigger 211 will trigger firing circuit 109. Firing circuit 209 through starter electrodes 208 will make ignitrons 204 conducting and apply the voltage of condensers 207 through common leads 197 and 222, and plates 118 and 119, respectively, to conducting shell or primary 116.

Firing circuit 209 also pulses time delay trigger 220 through lead 221 and at a predetermined time after condensers 207 have been discharged, firing circuit 219 causes condensers 217 to be connected through ignitrons 213 to the common lead 197, thereby applying the potential of condensers 217 to the conducting shell 116.

The voltage monitoring trigger 233 which monitors the voltage on secondary lead 235 and on common lead 197 will, at the time the voltage from stage III reaches a value of 500 volts, trigger ignitrons 227 thereby applying the potential from condensers 213 across the common leads 197 and 222 and to the conducting shell 116. The circuit breaker 225 effectively isolates the stage IV condensers from any of the previous voltage applications and is closed only when voltage monitor 236 indicates that the voltage on common lead 197 is 500 volts. The sequence of events with respect to the gaseous discharge within the toroidal chamber 115, the conducting shell 116 and the $B_z$-winding 120 is graphically shown in FIGS. 9 and 10. In general since the gas within the reactor chamber 115 is ionized there are numerous free electrons within the gas. The flow of current through the conducting shell or primary 116 will induce an electron flow within this gas. These electrons are the secondary electrical circuit for the primary electrical circuit, namely, conducting shell 116.

The induced current in the gas, i.e., the flow of the free electrons and ions within the gas, will pass around the toroidal chamber 115. As these electrons are accelerated their energy is passed on to ions by collision. These collisions, as explained above, give rise to bremsstrahlung. Furthermore, the secondary current continues to increase during the presence of primary inducing current and reaches a maximum value by a multi-stage process greater than 5 megamps. This large current flow will pinch or constrict in accordance with the above-described pinch effect. The electrons and the ions will be dragged towards the center of the toroidal chamber 115 so that a net space charge of zero will be maintained.

The exact sequence of operation with respect to the various stages of operation is shown in FIG. 9. The area shown by the bracket 247 is the pre-ionization stage and longitudinal magnetic field ($B_z$) application stage; 248 is referred to as the ionization and partial pinch stage or stage I; 249 is referred to as the Joule heating stage or stage II; 250 is a adiabatic compression and heating stage or stage III; 251 is the intermixing heating stage or stage IV; and 252 is intermixing heating and $B_z$ recovery stage. In particular, the pre-ionization stage 247 includes the time during which the gas is partially ionized by the R.F. system as described above and terminates at the time when the curve 254 of the $B_z$ field trapped in the plasma has attained its maximum uncompressed value 255, which in the presently disclosed device is approximately 50 kilogauss. This maximum is reached when the $B_z$ voltage has reached zero and the $I_{B_z}$ is a maximum, as shown in FIG. 10. At this maximum value 255, stage I of the primary voltage is discharged into the conducting shell 116 and the voltage pulse 256 (see FIG. 10) is impressed on the conducting shell 116. This pulse dissipates rapidly and after about 2 microseconds it has reached a value of 0.5 kv. at point 257. During this 2 microsecond pulse the discharge current curve 258 shows that the electrical current flowing within the gas has been raised to a value of approximately 700 kiloamps. at point 259.

It is also apparent from curve 260 (see FIG. 9) that the gas within the chamber 115 has a radius the same as the coil 135 during the pre-ionization stage 247, but during the primary voltage pulse 256 this radius is reduced by approximately 10 percent. This means that at the point 261 the plasma is no longer in contact with any physical member and is being held suspended in axial symmetry within the toroidal chamber 115. During this same primary voltage pulse of stage I, the trapped $B_z$ field curve 254 indicates that the flux density within the plasma, which has been reduced in radius, is increased approximately 10 percent, as is indicated by point 262. This increase in $B_z$ inside of the plasma is apparent when it is considered that since magnetic flux density is the number of lines of force per square centimeter, any action which reduces the area through which the field lines pass and which does not allow the field lines to escape, will have the effect of increasing the magnetic flux density. The current sheath as explained in detail hereinafter prevents the flux from escaping.

The temperature of the gas is shown by curve 263. Prior to stage I, the temperature of the gas was essentially zero and during the primary voltage pulse this temperature was raised to a value of about 0.1 kev. When the primary voltage pulse 256 reaches point 257, the second stage condensers are triggered and a Joule heating stage is entered. Stage II maintains a voltage of about 0.5 kv. on the pinched discharge, and, during this time, the discharge current curve 258 increases from 700 kiloamps. to about 1 megamp., while the plasma radius curve 260, and the $B_z$ curve 254 show essentially no change. However, during this time, which can be regulated from a minimum of about 100 microseconds to the order of 500 microseconds, the temperature of the plasma will be raised to a value of about 500 ev. at point 264 of curve 263.

By ordinary time delay methods described above the third stage of the primary voltage pulse is initiated after the pre-heating stage has been completed. Thus, at point 265 (see FIG. 10) the third stage of the condensers is discharged into the conducting shell 116 over an interval of approximately 620 microseconds with a maximum of —20 kv. The resulting increase in electric field accelerates the electrons and ions in the plasma, increasing the discharge current to a value of about 5 megamperes at point 267. The plasma is further compressed by the pinch effect to a radius at point 268 which is about one-third of its original value. This means that the $B_z$ inside the pinch is raised by a factor of about ten from 55 kilogauss to 550 kilogauss at 266, and that the temperature will attain values of 2 kev. at point 269.

When the stage III pulse has been reduced in value to about 0.5 kv. at point 270, the stage IV capacitance is connected to the primary circuit. At this time the fourth stage maintains a value of 0.5 kv. on the highly pinched plasma. The pinched plasma radius is maintained at about one-third its original value. However, the temperature shows a steady rise during the remainder of the pulse due to intermixing heating and reaches values of about 10 kev. The $B_z$ curve 254 (see FIG. 9) which has now attained a value of 550 kilogauss, will then decrease steadily due to the diffusion of the $B_z$-field lines through the current sheath and the $B_\theta$-field surrounding the pinch, as is described in more detail hereinafter. At approximately one-tenth second or slightly less, the internal pressure of the pinched plasma will have so increased as a result of the release of energetic fusion reaction particles that it will exceed the external pressure exerted by the surrounding fields, and the pinched plasma will start to expand. The $B_z$ and $B_\theta$ fields will expand and collapse, and it is expected that such collapsing fields will re-induce voltages in the coil 135 and in conducting shell 116. The latter will be opposite in sign to the original voltage supplied on the outside and will be used to recharge the condenser of stages III and IV. Curve 272 shows the direction of this re-induced voltage.

It can be seen from FIG. 9 that the plasma is being compressed by a factor of 10 and that the compression followed by the intermixing is the means by which the temperatures of the order of 10 million ° C. are attained. It should also be noted that this compression is being attained by means of magnetic fields, so that by the time the pinched plasma expands and comes in contact with the coil 135 the temperatures reached by the walls during the heat transfer to the coolant stays below the melting point of ordinary materials.

FIGURE 11 is a time diagram showing the relative position of the pinched plasma with respect to coil 135. The pre-ionization stage 247 is shown on the left of FIG. 11 with the stages 248, 249, 250, 251 and 252 corresponding to those stages in FIGS. 9 and 10 shown in sequence to the right. At the point where stage 247 ends and ionization stage 248 begins, i.e., upon the application of the primary voltage pulse 256 (see FIG. 10), the gas is pulled away from the walls and a current sheath 273 is created which is essentially tubular in form and is the primary volume through which the current is flowing along the pinched discharge. At the end of stage 248 and during the Joule heating stage 249 the radius of the pinched discharge is significantly lower than the original plasma radius. It is during these stages that high currents and temperatures are first attained. The adiabatic compression and heating stage 250 shows that the pinched discharge, which contains all of the $B_z$ lines which the full gas toroid originally contained within the coil 135, has been reduced to one-third its original radius, which necessarily means that the gas contained within the current sheath 273 has been compressed by a factor of about ten.

A more meaningful picture in terms of the field lines is shown in FIG. 12, which shows diagrammatically the sequence of events with respect to the pinched discharge in terms of time. During the pre-ionization stage 247, the $B_z$ lines in the contained volume 274, i.e., contained within the coil 135, which is in turn contained within the porcelain container 115, are uniformly spaced across the volume as shown on the left of FIG. 12. Upon the application of the stage I pulse, i.e., during the ionization and partial pinch stage 248, the $B_z$ lines are compressed as indicated at 275. The volume 276 contains the $B_\theta$-field, which is created by the current flowing through the pinched gas in the direction of the $B_z$-field confined within the pinched gas. Thus, during stage 248 the $B_z$-field lines are compressed within the plasma and confined within the current sheath 273 and a field, determined by the righthand rule, is created in the volume 276 by the current flowing in the pinched discharge. At the point 265 at the end of stage 249 the stage III pulse further compresses the $B_z$-field within the pinch and a greater $B_\theta$-field is created in the volume 276 because of the increased current flow in the pinched plasma. After the point 270 the $B_\theta$- and $B_z$-fields interdiffuse, and in so doing, magnetic energy is converted into heating of the pinch still further, to bring the temperature up to a point where fusion reactions are energetically profitable.

It should be noted at this point that the coil 135 has several significant purposes. First, it prevents the $B_z$-field lying in the porcelain wall 115 and between such wall and the conducting shell 116 from penetrating the volume 276. Secondly, since it may be wound in any direction desired, the current induced in 135 by inductive coupling to the conducting shell 116 can be made to create a field within the volume 276 which is opposite to the $B_z$-field contained within the pinch. Thus, when this field created by winding 135 is taken together with the $B_\theta$-field created by the pinched discharge, the net field in 276 is actually a spiral having a direction opposite to that of the trapped B-field and in this manner a greater torsion across the plasma boundary is created. Thus, by way of example considering FIG. 12, the trapped $B_z$-field is in the direction to the right. The $B_\theta$-field is perpendicular to the paper and the $B_z$-field created by winding the coil 135 in the appropriate manner is in the direction of the arrow 277. Thus, in order for a $B_z$-field lines to escape from the pinched discharge, it would not only have to penetrate the current carrying sheath 273 but would have to pass through a field in the volume 276 which was at least 90° out of phase and may approach a phase difference of 180°.

At the end of the intermixing heating stage (stage IV), a switch (not shown) which has connected the ends of coil 135 during the previous stages is opened. At this point the coil has served its pinch-stabilizing purpose and it should be opened to avoid the large $I^2R$ losses resulting from circulating currents induced by the expanding magnetic fields. Sparking is avoided and the energy stored in the fields is recaptured by switching it to discharge into the condenser banks and the commercial power lines. These operations on coil 135 can be initiated by any of several conventional techniques, e.g., a timer operating in a preordered sequence, a neutron counter which gives the appropriate signal when the fusion reaction rate has risen to the appropriate level, etc.

FIGURE 13 shows the relation between the $B_\theta$-field at the pinch and the $B_\theta$-field at the wall with respect to time. Thus, in FIG. 13 at point 257 (see FIG. 10 also) the $B_\theta$-field at the plasma-vacuum interface, $B_{\theta P}$, has attained a slightly greater value than the $B_\theta$ at the wall, $B_{\theta W}$, as shown by curves 278 and 279, which represent $B_{\theta P}$ and $B_{\theta W}$ respectively. At the point 265, i.e., the application of the stage III condensers, $B_{\theta P}$ rises very much more rapidly than $B_{\theta W}$ and attains values during stages 251 and 252 which are three times the values of the $B_{\theta W}$. This is apparent since the radius of the pinch has been reduced to one-third its original value.

FIGURE 14 depicts graphically the relationships between the voltage applied to the conducting shell 116 (curve 256), the $B_z$-field inside the pinch (curve 254), and the $B_z$-field outside the pinch, near the plasma-vacuum interface (curve 280), curves 254 and 256 being identical with the same curves in FIGS. 9 and 10. Curves 254 and 280 are identical during the period 247, prior to the application of the first voltage to conducting shell 116. At the latter time the magnetic field surrounding the rising current in 116 induces a current in the shorted coil 135. Owing to the manner in which coil 135 is wound, a $B_z$-field is established in the direction opposite to that in the plasma. As the bulk of the original $B_z$-field is trapped within the collapsing plasma, the reversed $B_z$-field (curve 280) supplied by coil 135 cancels the remaining part of the original field and rapidly crosses over into the negative area to produce a net reversed $B_z$-field in the vacuum, the magnitude depending on the size of the applied voltage pulse and the inductance of the coil 135.

Owing to the time lag between the applied voltage pulse and the rise of current in coil 135, as indicated in curve 281 (FIG. 13), this reversed $B_z$-field does not collapse at the end of the first voltage pulse, but continues to rise slowly until the application of the second pulse at 265, when a second increase of $B_z$ in the reverse direction takes place. At the end of this pulse, time 270, intermixing heating begins to take place as the trapped $B_z$-field diffuses out of the plasma. This time has been delayed and the stability of the pinched plasma prolonged by the strong torsion across the plasma boundary as a result of the reversed $B_z$ in the vacuum.

In considering possible materials for the coil 135, it may be considered that $\Delta T$, the temperature rise of a surface upon which there is incident an energy flux of Q, is $$\Delta T = \frac{2Qt^{1/2}}{\sqrt{\pi CK\rho}}$$

where $C$ = thermal conductivity
$K$ = thermal capacity
$\rho$ = density
$t$ = time To compare possible materials, a figure of merit M is defined as equal to $Qt^{1/2}$ and $\Delta T$ is taken at the melting point of the material, or $$M = Qt^{1/2} = \text{constant } \sqrt{CK\rho}\ \Delta T_{MP}$$

On this basis, the relative figures of merit of possible materials for the coil 135 are shown in Table 1:

*Table 1*

| Material: | Figure of merit (arbitrary scale) |
|---|---|
| Diamond | 50,000 |
| Tungsten | 18,510 |
| Boron carbide, $B_4C$ | 14,430 |
| Molybdenum | 11,800 |
| Graphite | 9,610 |
| Copper | 9,340 |
| Tantalum | 8,300 |
| Beryllium | 7,640 |
| Silver | 7,260 |
| Zirconium | 7,150 |
| Gold | 6,900 |
| Nickel | 6,720 |
| Iron | 6,000 |
| Nickel steel | 5,500 |
| Beryllia | 4,690 |
| Silicon carbide | 4,400 |
| Aluminum | 3,500 |
| Beryllium carbide | 2,830 |
| Zirconia | 1,690 |
| Alumina | 1,630 |
| Pyrex | 340 |

For use in the preferred embodiment described, wherein the coil 135 must be a conductive material, insulating materials such as diamond cannot be used except perhaps as a coating for a conductive base. On the other hand, since contamination cannot be completely avoided, it is preferable not to expose to the plasma metals of high atomic number such as tungsten. The best compromise seems to lie in one of the metals of good electrical conductivity, relatively high figure of merit, and a not-too high atomic number, such as copper, aluminum or beryllium. The possibility of using new intermetallic compounds of the light metals, e.g., $MgBe_{13}$, should not be overlooked. It should also be noted that the coil 135 may be made entirely of an electrically conductive material so long as the voltage between adjacents turns is less than the minimum for breakdown of the plasma.

As can be seen from the righthand portion of FIG. 9, at approximately 0.1 second the $B_z$-field leakage will become appreciable, so that $B_\theta$ and $B_z$ no longer have the values required, as described above, for the pinch to be stable. If the operating voltages are applied in the proper sequence, the pinch will re-expand to the wall, and the electromagnetic energy will be recovered before the instability is fully developed. Otherwise the electromagnetic energy is not recoverable directly, but appears as heat. (See curve ends 287, 288, and 289.) At the same time the radius of the pinched plasma will increase and the plasma will expand and contact coil 135, which will carry away the heat produced upon contact. However, since coil 135 is constructed of metal having good thermal conductivity, spallation and contamination of the plasma by wall fragments and particles is very much reduced.

Thus it is apparent that one operating cycle will last approximately 0.1 second and that for at least half of this cycle the fusion reactions are taking place and creating energy in the form of bremsstrahlung, neutrons and charged particles. The reacting plasma contains fusion products which are swept out into a gas recovery and purification system. Further, since the various condensers of stages I through IV of the primary electrical system may have been partially recharged by the re-induced voltage (see curve 272), the electrical system is partially prepared for a second operation. It should also be noted that during the interval between pulses the coolant systems of the various components have been continually operating and have reduced the temperature of the various components to room temperature, so that no large portion of the heat created in the previous cycle resides in the apparatus at the beginning of the next cycle. Thus a second cycle primary voltage pulse 256 can be applied and the second cycle of operation begun. In this manner the reactor is discontinuously operated with fusion reactions taking place at the latter portion of each operating cycle. Thus 0.1 sec. represents the energy generating cycle. The repetition of the cycle can in principle come immediately thereafter. In the preferred embodiment, 0.9 sec. is allowed after the energy generation to remove heat. Thus a one second period of operation is preferred.

Although no dimensions have been listed for the embodiment described because it is felt that they can be determined by well-known methods, it is believe that a toroidal gas volume of a 200 cm. major diameter and 5 cm. minor diameter at a filling pressure of 100 microns of 50% $D_2$, 50% $T_2$ will provide a large fusion energy output under the operation conditions described above.

In considering first the electricity generating phenomenon which takes place within the reacting gas, it will be remembered that in order to attain a pinched discharge a certain amount of work had to be done, i.e., a specific amount of energy was utilized in obtaining the pinch. After this pinch is obtained and the gas is heated to sufficiently high temperatures, fusion reactions take place. This reaction liberates energized charged particles which were not present in free form before the reaction took place. The charged particles tend to expand against the action of the confining magnetic field. In so doing they perform work. This work expands the confining magnetic fields, and in so doing induces a secondary current in the primary coil.

This will be apparent by considering the number and energy of the particles present in the reacting gas. In a mixture of deuterium and tritium gas the (D, T) reaction results in the production of alpha particles. These charged particles, which are born with high energies, will move radially outward against the constraining force of the magnetic field. Thus, since the gas particles now have a total energy greater than the energy deposited originally from the outside, i.e., the primary coil energy, more energy would be required in order to confine them. Since no such additional confining energy is made available, these particles will expand. It follows, therefore, that in the expansion of these charged particles, the magnetic field ($B_\theta$) can put energy back into the primary which, if there were no irreversible processes, would be equivalent to the work done originally to obtain the pinch. There are several irreversible processes which act to diminish the amount of energy returned by direct conversion: these are (1) electrical losses in conductors because of resistance, (2) diffusion of charged particles across the magnetic field, (3) interdiffusion of the magnetic fields.

Similarly, if the (D, D) reaction is considered, the ionized protons, tritons and $He^3$ liberated by the fusion reactions taking place within the gas may likewise result in an induced electrical current within the primary. However, in this case, the starting temperature must be higher.

The magnitude of this electrical energy will depend upon the temperature present in the gas, the degree of pinch obtained, i.e., the amount of work required to escape against the magnetic forces, and the total energy of the particles.

The energy present which is not reflected in the form of induced current either raises the temperature of the gas or is lost to the outside in the form of neutrons and other escaping radiations. As to the former, i.e., the energy imparted to the gas to raise its temperature, when the pinch is lost through lateral displacement so that the symmetry of the gaseous discharge is disrupted, the heated gas will come into contact with the coil 135, imparting a portion of its energy to the coolant therein. The coolant will thus be heated. The heated coolant is then passed through a heat exchanger so that the energy can be utilized.

The escaping particles and radiations, i.e., the protons, $He^3$, alpha particles, bremsstrahlung, etc., will be absorbed either in the coil 135 or its coolant, thereby raising its temperature. The neutrons produced by the reaction taking place within the confined gas will be fast neutrons, i.e., they will have energies of from 2 to 14 mev. Therefore, they will not be captured or reduced to thermal energies in any significant amount by the structure shown, but for the most part will escape therefrom.

Such neutrons may be utilized in a number of ways. One use is with a breeder blanket of lithium, as indicated symbolically in FIG. 3, to manufacture tritium according to the reaction:

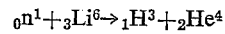

$$_0n^1 + _3Li^6 \rightarrow _1H^3 + _2He^4$$

They may also be utilized with breeder blankets of uranium or thorium to convert or breed highly fissionable isotopes from those with low fission cross sections. It is also entirely feasible to use a blanket or shell of such fissionable isotopes as $U^{235}$ or $Pu^{239}$ in a non-critical configuration, thereby obtaining a nuclear fission reactor without the need for control rods and increasing the available energy several fold.

Such a blanket can be arranged co-axially with the torus or linear pinch chamber or in the form of a spherical shell surrounding the entire chamber. The fission reactor structure may be designed to operate on the unmoderated fast neutrons released in the pinch, or on neutrons of lower energies, as by a homogeneous dispersion of the fissionable material in a moderator or the interposition of a moderator shell. It is even possible to utilize the neutron energy directly, as by providing a thick enough blanket of a moderator-coolant to reduce the neutrons to thermal energies. No specific structures are shown because the knowledge to design them is well known to fission reactor designers.

FIGURE 8 shows the manner in which any reinduced voltage and resulting current may be utilized to recharge the condensers and to provide useful energy. When the reinduced voltage appears across common leads 197 and 222, condensers 200 and 207 will be charged up with the polarity opposite to that which they had during discharge. In the preferred embodiment, charging circuits 203 and 206 are relied upon to overcome this opposite polarity and recharge these two stages in the same manner as they were originally charged. This can be done for stages I and II since the total energy stored is not too great. However, for stages III and IV the reversing switches 216 and 230 respectively are provided so that during the latter portion of the energy producing cycle these condensers are charged with the proper polarity for a second cycle.

In the heated, ionized gas, the electrons are interacting with the ions, i.e., the electrons are inelastically colliding with the ions. These collisions, although confined to the pinched gas, give rise to bremsstrahlung as explained above.

Bremstrahlung is easily absorbed by the surrounding materials, particularly the coolant flowing through coil 135, since the energies present are not large. This will result in the raising of the temperature of the liquid coolant.

This then represents one cycle of operation of the device. With a time interval of about one second, for example, between discharge of the capacitors and subsequent recharge by the re-induced voltage, the present device, although in the nature of a pulsed reactor, represents a virtually constant supply of easily usable energy.

The attainment of fusion reactions are a result of applying an electric field to the ionized gas which is sufficient to induce a current in the gas greater than the value required to obtain a pinch effect. This voltage must be applied for a time sufficient to insure that much of the energy of the electrons is transferred by collision to the gas ions, thereby raising the gas temperature.

Furthermore, the reaction taking place is not allowed to assume uncontrolled proportions because the density of the gas within the chamber is low, i.e., about $10^{14}$ or $10^{15}$ particles per cc. but not more than $10^{16}$ particles per cc., and the amount of thermonuclear fuel within the chamber upon which the pinch is acting will not sustain fusion reactions for an indefinite length of time. The utilization of low density gaseous thermonuclear fuels in the present device is the primary factor in controlling the rate of reaction within the chamber. Further control over the reaction taking place is present in the form of the electrical circuit connected to the primary coil. By merely disconnecting the energizing circuit for the primary coil, the pinch effect will no longer be created in the gas, and therefore no fusion reactions will take place.

It is therefore apparent that the present invention provides a method and apparatus for attaining and controlling fusion reactions. Furthermore, means are provided whereby the energy released is converted into various forms of useful energy, i.e., heated matter, electricity or radiation by-products such as neutrons and the like. It should be clear also that the operation of the device is not dependent on the direct recovery of electrical energy, since most of the energy output of the device appears as heat in the coolant.

The above-described embodiment has been employed repeatedly to produce neutron bursts of at least $10^7$ per cycle at deuterium gas fillings of 2 microns, with an initial $B_z$ of 2.5 kilogauss and a pinching stage gradient of 150 volts/cm. It has not been possible to identify the source of these neutrons, as with such yields there is no positive means for identifying them as thermonuclear vel non. The (D, T) or (D, D) reaction can be made to occur by accelerating one particle against the other with so little impact energy that identifications based on the slightly higher energy of the neutrons so produced are believed to be untrustworthy. The only method now believed feasible for such identification is to obtain such high yields per unit volume of pinched thermonuclear fuel that the colliding particles could not have been accelerated the distance necessary for the acceleration mechanism to dominate.

While the present invention has been described in detail only for a toroidal geometry, it will be obvious to those skilled in the art how it may be applied to structures involving other geometries, e.g., the linear discharge device described in the above-mentioned publication J. App. Phys. 28, 519, wherein the continuous electrical paths of a toroidal structure are made possible by external circuitry joining the electrodes at the ends of the linear structure.

It is thus apparent that the advance in the art of the present invention lies in the methods and means already disclosed to accomplish (a) an increase in the stability of the pinch, thereby promoting greater heating of the thermonuclear fuel and allowing more time for fusion reactions, and (b) a marked reduction in the wall impurities which contaminate such a fuel and frequently lead to excess bremsstrahlung losses. In the foregoing pages these results have been shown to flow from the use of a shorted secondary coil of a metal selected for its characteristics of good thermal and electrical conductivity (the thermal type being selected according to the above-discussed figure of merit) and the low mass numbers of its constituents, this coil being wound to provide a $B_z$-field which will oppose that of the $B_z$ winding and being so constructed and disposed as to shield the ceramic gas-tight container from radiation emanating from the plasma, and being hollow so that a coolant can be circulated throughout its length.

It will now be obvious to those skilled in the art that there are many alternate and modified means for accomplishing the named results in accordance with the teachings herein. In using a structure of the type described, for instance, the ends of the coil 135 need not be connected to each other, but may be connected to an outside power source for independent energization. Also, the electrical coil may be external to the ceramic container, wound in such manner as to provide a $B_z$-field opposed in direction to that of the $B_z$-winding; this would leave for the interior structure only the radiation-absorbing function and would permit the use of insulating material of a high figure of merit. (See Table 1.) With a linear type reactor, as opposed to the toroidal type shown as a preferred embodiment, it is possible to consolidate some of the parts of the device, as there is no need for an insulator to separate the ends of the conducting shell. Thus the conducting shell itself may serve as the gas-tight container, requiring only a glaze of insulation to prevent conduction to the plasma. The coolant flowing inside the shell may thus serve as the radiation-absorbing means, and the reversed $B_z$-field may be provided by a coil either inside or outside the conducting shell.

What is claimed is:

1. A pinched plasma neutron source comprising in combination an elongated, generally cylindrical insulating chamber, a filling of gas within said chamber selected from the class consisting of deuterium and a mixture of deuterium and tritium, an electrically conductive shell surrounding said chamber, said conducting shell being adapted to receive voltage pulses to ionize and induce a current in said gas and to compress said ionized gas to form a pinch, a first electrical winding surrounding said conducting shell, said first winding being adapted for connection to an external source of electrical energy to provide an axial magnetic field filling said chamber prior to said voltage pulses, said winding utilizing the axial length of said conducting shell for its return path and a second electrical winding within said chamber, said second winding having its ends shorted together and being so wound with respect to the direction of current flow through said conducting shell as to produce an axial magnetic field opposing that of said first winding as a result of electromagnetic coupling between said conducting shell and said second winding, said winding being of such offset cross section and being so wound that there is no contact between adjacent turns and there is no part of said chamber wall exposed to its center line, said winding being composed of a material having a high figure of merit, good electrical conductivity and a low Z-number, each of said electrically conductive members containing a through coolant channel.

2. A neutron source comprising in combination a gas-tight elongated conductive shell having an insulating coating on its inside surface, a gaseous filling within said shell selected from the class consisting of deuterium and a mixture of deuterium and tritium, said gas-tight shell terminating in a pair of spaced-apart electrodes, a first electrical winding surrounding said shell and adapted for connection to an external source of electrical energy to provide a first, essentially constant axial magnetic field therein, said winding utilizing the axial length of said conducting shell for its return path, electrical means connected to said electrodes of said conductive shell to successively ionize said gas to a plasma, induce a current therein, compress and heat said plasma, simultaneously compressing said axial magnetic field, and a second electrical winding coaxial with and inside said conductive shell, said second winding being so wound and coupled to sources of electrical energy including said conducting shell as to supply a second magnetic field opposing said first magnetic field after said compression thereof, said second winding being of such offset cross section and being so wound that there is no contact between adjacent turns and said insulating coating on said shell is protected from direct radiation emanating from said pinched plasma, said second winding being composed of a material having a high figure of merit, good electrical conductivity and a low mass number, and having a coolant channel extending throughout its length.

3. A source of neutrons comprising in combination a toroidal chamber composed of an electrically insulating material, a conducting shell surrounding said chamber, said shell having a discontinuity to prevent shorting and to provide electrical connections to outside power sources, a filling of a gas at a pressure of not more than 100 microns in said chamber, said gas being selected from the class consisting of deuterium and a mixture of deuterium and tritium, a first electrical winding surrounding and coaxial with said conducting shell, said first winding being adapted for connection to a first electrical means to provide an essentially constant first axial magnetic field, a second electrical means connected to said conducting shell to successively ionize said gas to a plasma, induce a current therein which progressively compresses or pinches said plasma and said first axial magnetic field, heats said pinched plasma and increases its stability, and a second electrical winding co-axial with and inside said chamber, said winding having its adjacent turns electrically separated and having such an offset cross section and being so wound as to shield said chamber from direct radiation emanating from the region near the center line of said chamber, being so wound and coupled to a source of electrical energy as to provide a second magnetic field opposing said first magnetic field, being composed of materials having high figures of merit and low Z-numbers and having an interior passage throughout its length for the passage of a coolant to absorb radiations and to carry away conducted heat.

4. A pinched plasma neutron source comprising in combination an elongated chamber composed of an electrical insulating material, a conducting shell surrounding said chamber and terminating in a pair of separated electrodes, a filling of a gas within said chamber at a pressure of not more than 100 microns, said gas being selected from the class consisting of deuterium and a mixture of deuterium and tritium, electrical energy means connected to said electrodes to ionize said gas to a plasma, induce a current therein, compress or pinch said plasma and heat said pinched plasma, an electrical winding surrounding said conducting shell and using its axial length for its return path, said winding being adapted for connection to an external source of electrical energy to provide an essentially constant axial magnetic field within said chamber prior to the formation of said pinched plasma, and a wall shielding member within said chamber, said member having the form of a hollow spiral disposed adjacent the inside surface of said chamber to shield said surface from direct radiations emanating from said pinched plasma, the adjacent turns of said spiral member overlapping to provide such shielding but not being in electrical contact, the ends of said spiral member being electrically separated from each other, said spiral member being composed of materials having high figures of merit and low Z-numbers, and a coolant flowing throughout said spiral member to absorb and carry away radiations and heat.

References Cited in the file of this patent
UNITED STATES PATENTS 2,868,991     Josephson et al. _____ Jan. 13, 1959
2,910,414     Spitzer _____ Oct. 27, 1959

OTHER REFERENCES

Journal of Applied Physics, May 1957, vol. 28, No. 5, Buckhardt et al., pp. 519–521.

J. Nuclear Energy II, 1957, vol. 5, pp. 71 to 85, Pergamon Press Ltd., London (Bezhatchenko et al.).

February 1958 Nucleonics, pp. 90–93, 151–155.